(12) United States Patent
Jeong et al.

(10) Patent No.: US 8,347,311 B2
(45) Date of Patent: Jan. 1, 2013

(54) OPERATION METHOD OF MOBILE APPLICATION MODEL

(75) Inventors: Seok-Jae Jeong, Hwaseong-si (KR); Jin-Hee Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 483 days.

(21) Appl. No.: 12/651,748

(22) Filed: Jan. 4, 2010

(65) Prior Publication Data

US 2010/0175072 A1    Jul. 8, 2010

(30) Foreign Application Priority Data

Jan. 2, 2009 (KR) .......................... 10-2009-0000111

(51) Int. Cl.
*G06F 13/00* (2006.01)

(52) U.S. Cl. ......... 719/312; 719/329; 718/100; 718/107

(58) Field of Classification Search ................... 719/312, 719/329; 718/100, 107
See application file for complete search history.

(56) References Cited

U.S. PATENT DOCUMENTS

| | | | |
|---|---|---|---|
| 7,178,109 B2 * | 2/2007 | Hewson et al. ............... | 715/790 |
| 7,870,566 B2 * | 1/2011 | Zhang et al. .................. | 719/318 |
| 2004/0015979 A1 * | 1/2004 | Shen et al. .................... | 718/107 |
| 2008/0270731 A1 * | 10/2008 | Bryant et al. ................. | 711/170 |

* cited by examiner

*Primary Examiner* — Andy Ho
(74) *Attorney, Agent, or Firm* — The Farrell Law Firm, P.C.

(57) ABSTRACT

An operation method of a mobile application model is provided. An application model is composed that separates applications into individual views and executes the individual views with independent processes. Only a code for a running view is loaded in a memory and a corresponding application is executed in the composed application model when switching to the running view for execution of the corresponding application.

8 Claims, 4 Drawing Sheets executable application

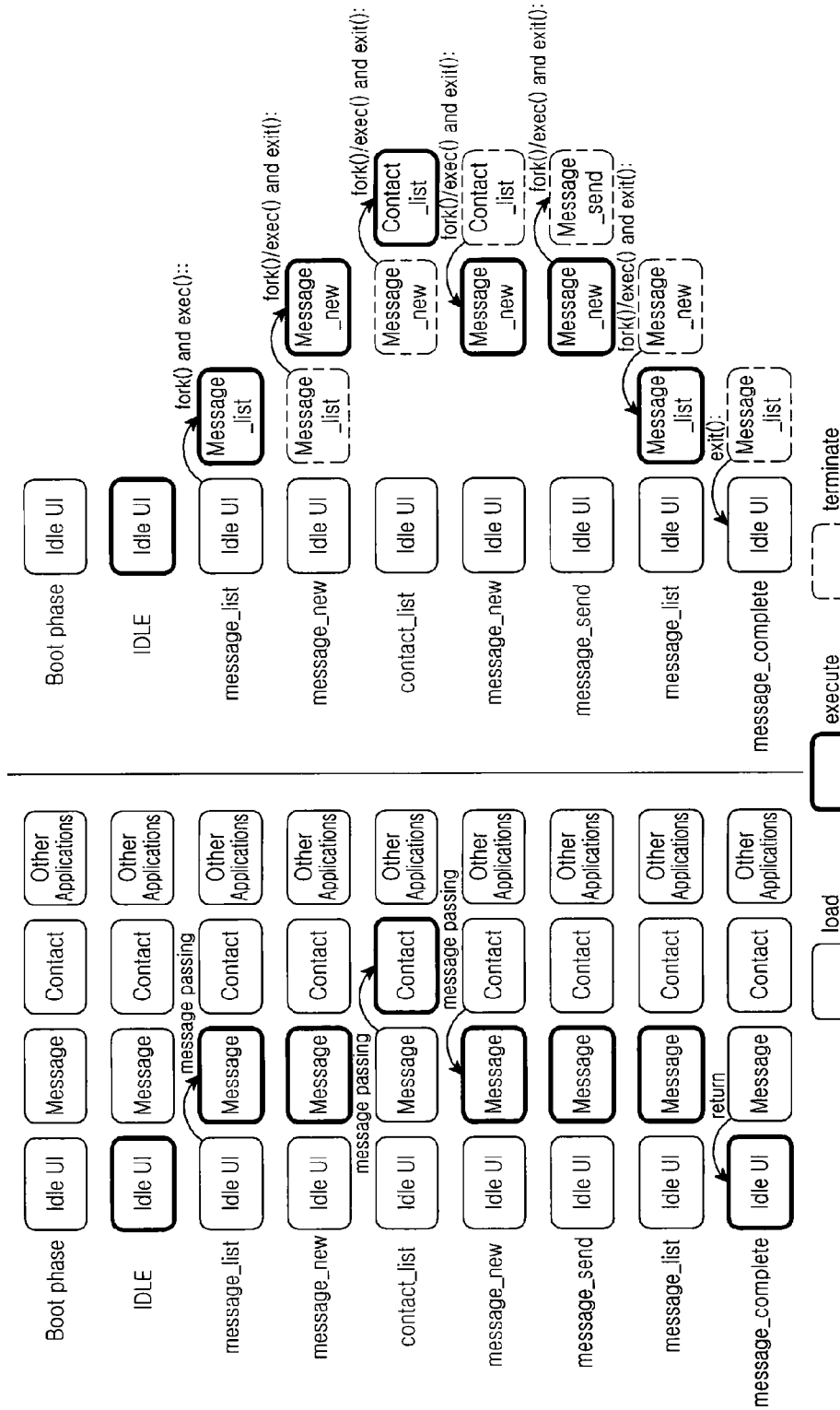

OPERATION METHOD OF MOBILE APPLICATION MODEL

PRIORITY

This application claims priority under 35 U.S.C. §119(a) to a Korean Patent Application filed in the Korean Intellectual Property Office on Jan. 2, 2009 and assigned Serial No. 10-2009-0000111, the entire disclosure of which is incorporated herein by reference.

BACKGROUND OF THE INVENTION

1. Field of the Invention

The present invention relates generally to an operation method of a mobile application model. More particularly, the present invention relates to an operation method of a mobile application model that separates mobile applications into individual views and operates the individual views with independent processes.

2. Description of the Related Art

Typical application models include all views that are provided by an application in a single process. The application includes a set or thread of functions for respective constituent views.

A shared library-type application model has an application configuration that is equivalent to an application model that includes multiple views in a single process. However, the shared library-type application model loads shared codes commonly used among its applications in order to speed up boot times of the applications.

In an application model that includes an application having a single thread, all functions of the application are included in the single thread. In this application model, a plurality of applications may exist in a single process, and a memory may be shared by the applications in the single process.

In a message-based application model, all applications in the system operate as a single thread, and each application is executed by invoking a relevant function through message delivery.

The message-based application model is most widely used to develop mobile software. This is due to the fact that the message-based application model provides fast reactivity despite its low CPU performance, which is caused by hardware and software characteristics of existing mobile terminals.

FIG. 1 is a diagram illustrating an operation procedure of a message-based application model.

In a message-based application model conventionally used to develop mobile software, all applications included in the system as well as the application in use are running because the applications are included in one process.

Referring to FIG. 1, if message application execution (or message list application) is selected in an idle state "idle" in step 100, a "message" view (new message view or message-write view) is displayed on a display. If a contact list application is selected in step 101 after message content is written in the "message" view, a "contact" view (contact list view) is displayed on the display. When a recipient is selected in the "contact" view and an OK is input in step 102, the "message" view, on which the message content is written, is displayed. Thereafter, if a message sending application is selected in step 103, the message is sent.

While the above operation is being executed, a code for the idle state, a code for the message writing, a code for the contact list, and codes for other applications aside from the message application are stored and preserved in a memory.

Therefore, when the message application is being executed through the message-based application model, codes for executing other views aside from the view that is currently displayed are also continuously loaded in the memory, causing a waste of memory.

Further, when the memory is shared among the many applications, the system may crash due to an error of one application, which may result in the propagation of serious and latent bugs.

Additionally, since applications are executed by function invocation through message delivery, codes for managing and scheduling all applications are created in an application stage, and not in a system kernel stage.

SUMMARY OF THE INVENTION

The present invention has been made to address at least the above problems and/or disadvantages and to provide at least the advantages described below. Accordingly, an aspect of the present invention provides an operation method of a mobile application model that separates mobile applications into individual views and operates the individual views independently.

According to one aspect of the present invention, an operation method of a mobile application model is provided. An application model is composed that separates applications into individual views and executes the individual views with independent processes. Only a code for a running view is loaded in a memory and a corresponding application is executed in the composed application model when switching to the running view for execution of the corresponding application.

BRIEF DESCRIPTION OF THE DRAWINGS

The above and other aspects, features and advantages of the present invention will be more apparent from the following description when taken in conjunction with the accompanying drawings, in which:

FIG. 4A is a diagram illustrating conventional memory use during operations of message applications in a message-based application model; and FIG. 4B is a diagram illustrating memory use during operations of message applications in a mobile application model, according to an embodiment of the present invention.

DETAILED DESCRIPTION OF EMBODIMENTS OF THE PRESENT INVENTION

Figure 1:
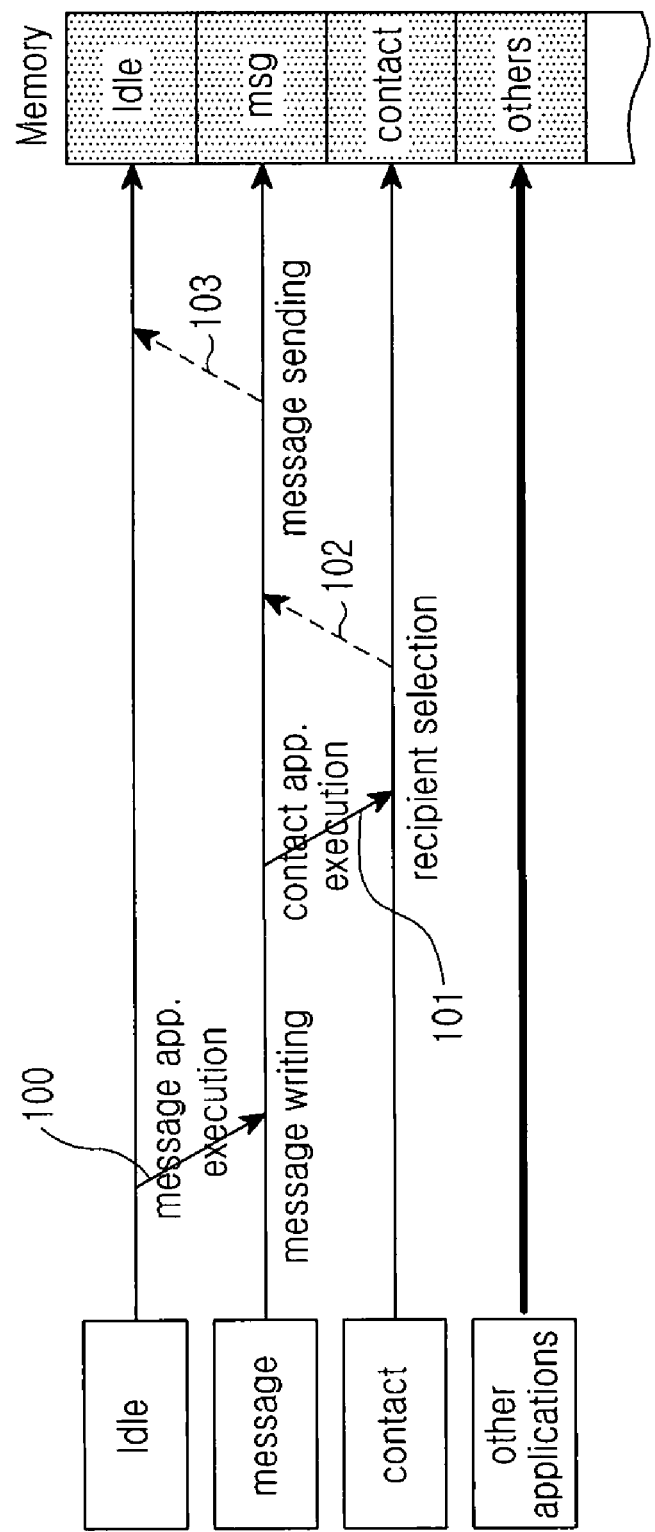
FIG. 1 is a diagram illustrating an operation procedure of a message-based application model.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The present invention provides a mobile application model that is designed to separate mobile applications into individual views and execute the individual views with independent processes.

In the mobile application model of the present invention, whenever a view is switched to execute a certain application, only a code for a running view, i.e., a view now displayed on a screen, is loaded in a memory. Codes for non-running views are removed from the memory.

The term "view," as used herein, refers to an interface screen on which an application provides a particular function to a user. For example, views may include a message list view, a message content view and a message send view of a message application, and a contact list view and a new contact list input view of a contact list management application.

An operation procedure of a mobile application model according to an embodiment of the present invention is described in detail below through an operation procedure of a message application.

Figure 2:
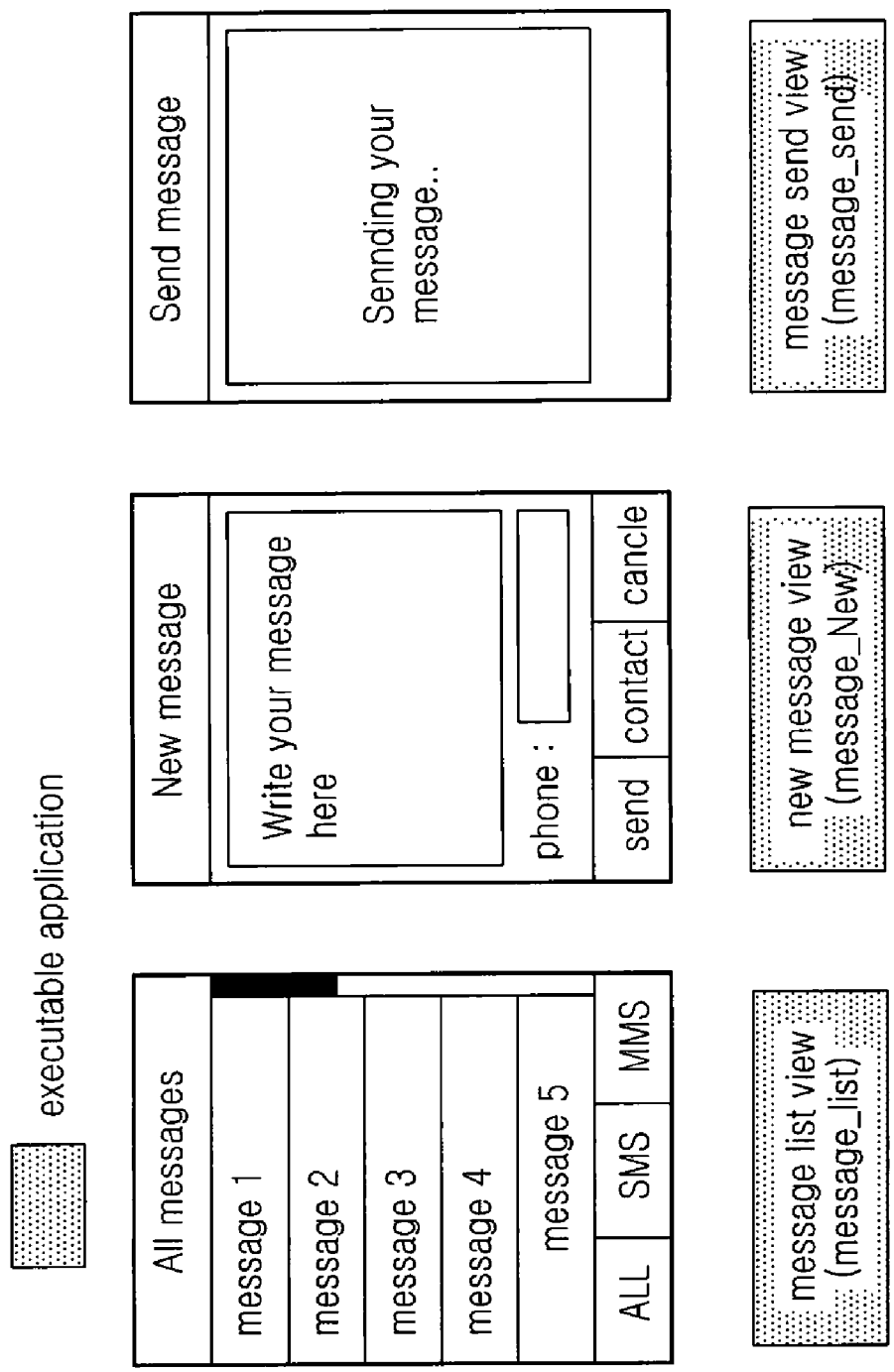
FIG. 2 is a diagram illustrating a message application in a mobile application model, in which views are composed with an executable application for operation by independent processes, according to an embodiment of the present invention.

Referring now to FIG. 2, a diagram illustrates a message application in a mobile application model, in which views are composed with an executable application and are operated with independent processes, according to an embodiment of the present invention.

In the message application, a "message_list" view (message list view), a "message_new" view (new message view or message-write view) and a "message_send" view (message send view) are composed with one executable application, and each view is executed with an independent process.

Figure 3:
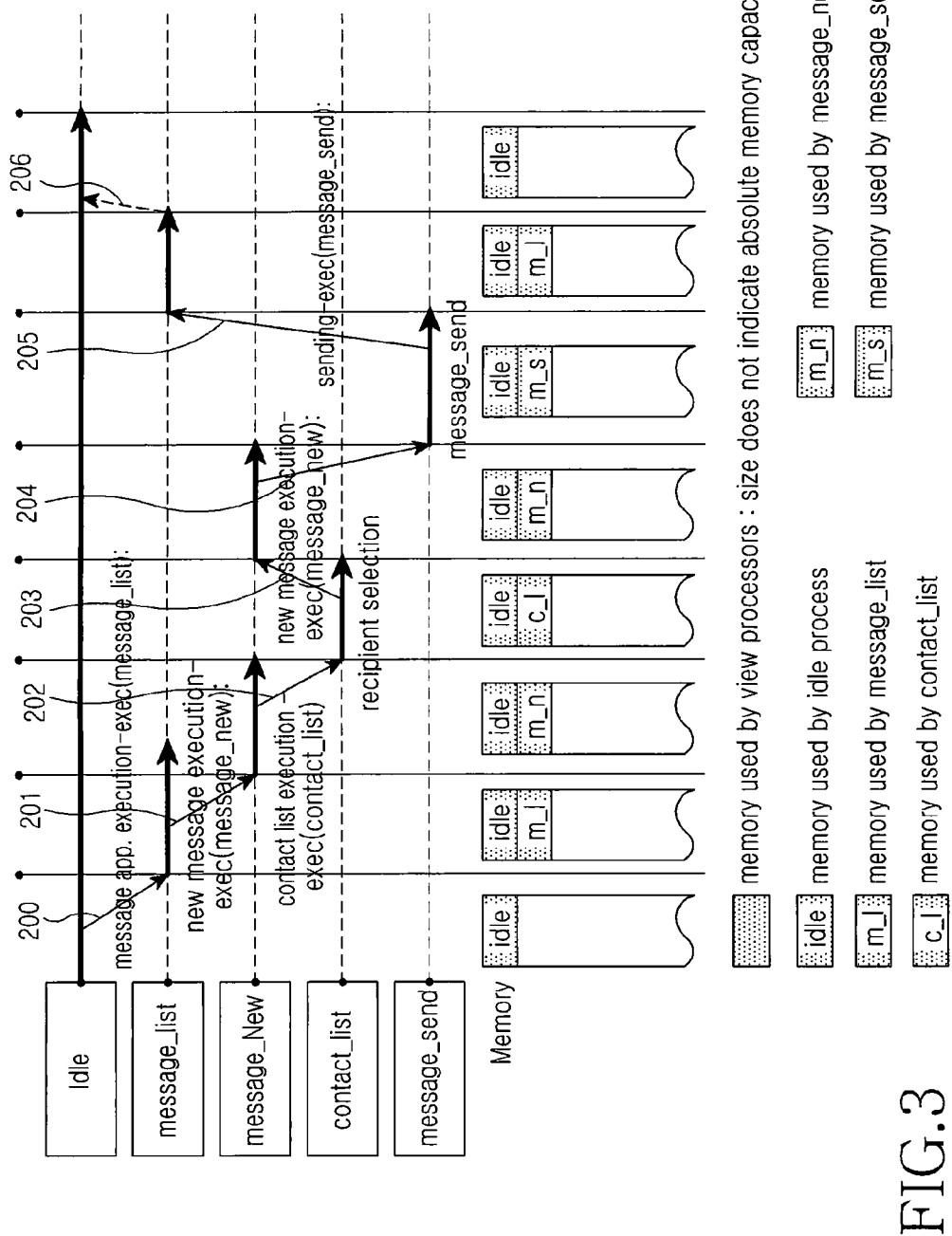
FIG. 3 is a diagram illustrating an operation procedure of a message application in a mobile application model, according to an embodiment of the present invention.

FIG. 3 is a diagram illustrating an operation procedure of a message application in a mobile application model, according to an embodiment of the present invention. In FIG. 3, applications can be separated into individual views and the individual views can be executed with independent processes, as in FIG. 2.

Referring to FIG. 3, in an idle mode state, only a code "idle" for executing the idle mode is loaded in a memory.

If a message application execution ("message_list" application) is selected in the idle mode state in step 200, a "message_list" view, which is a first screen of the message application, is displayed on a display. The code "idle" for executing the idle mode and a code "m_l" for executing the "message_list" view are loaded in the memory.

If a new message application (or message-write application) is selected in step 201 while the "message_list" view is displayed, a "message_new" view (new message view or message-write view) is displayed on the display. The code "m_l" for executing the "message_list" view is removed from the memory, and the code "idle" for executing the idle mode and a code "m_n" for executing the "message_new" view are loaded in the memory.

If a contact list application is selected in step 202 after message content is written in the "message_new" view, a "contact_list" view is displayed on the display. The code "m_n" for executing the "message_new" view is removed from the memory, and the code "idle" for executing the idle mode and a code "c_l" for executing the "contact_list" view are loaded in the memory.

If a recipient who will receive the message is selected and an OK is input in step 203 while the "contact_list" view is displayed, the "message_new" view, on which message content is written, is displayed. The code "c_l" for executing the "contact_list" view is removed from the memory, and the code "idle" for executing the idle mode and the code "m_n" for executing the "message_new" view are loaded in the memory.

While the "message_new" view is displayed, if a message-send application is selected in step 204, the message is sent. The code "m_n" for executing the "message_new" view is removed from the memory, and the code "idle" for executing the idle mode and the code "m_s" for executing the "message_send" view are loaded in the memory.

When the message sending is completed in step 205, the "message_list" view is displayed again on the display. The code "m_s" for executing the "message_send" view is removed from the memory, and the code "idle" for executing the idle mode and the code "m_l" for executing the "message_list" view are loaded in the memory.

If termination of the message application is selected in step 206 while the "message_list" view is displayed, the code "m_l" for executing the "message_list" view is removed from the memory and only the code "idle" for executing the idle mode is loaded in the memory.

The message content written in the "message_new" view by the selection of step 201 is required to send the message in step 204.

Therefore, an execution argument indicating the written message content is delivered when the contact list application is executed by the selection of step 201. The execution argument is delivered again when the new message application is executed after a recipient is selected from the contact list by the selection of step 202, thereby preventing a loss of the written message content.

Referring now to FIG. 4A, a diagram illustrates conventional memory use during operations of message applications in a message-based application model. FIG. 4B is a diagram illustrating memory use during operations of message applications in a mobile application model, according to an embodiment of the present invention.

In FIG. 4A, when message applications are executed in a message-based application model, the applications are executed while both a code for the running view and codes for the non-running views are loaded in the memory.

On the contrary, in FIG. 4B, when message applications are executed in a mobile application model, according to an embodiment of the present invention, only the code for the running view is loaded in the memory. The codes for the non-running views are removed from the memory, thus saving the Residence Set Size (RSS) and bringing greater system stability.

As is apparent from the foregoing description, the embodiments of the present invention provide a method for separating mobile applications into individual views and operating these views independently. Therefore, a running view operates with a single independent process, thereby saving RSS.

Additionally, processes do not share the memory, making it possible to block bugs that an error of one application may propagate to other applications.

Moreover, the present invention may abide by the process scheduling policy provided by the system kernel, thus preventing overhead when an application stage manages several applications, and ensuring greater system stability.

While the invention has been shown and described with reference to a certain embodiments thereof, it will be understood by those skilled in the art that various changes in form and detail may be made therein without departing from the spirit and scope of the invention as defined by the appended claims and their equivalents.

What is claimed is:

1. An operation method of a mobile application model, comprising the steps of:

composing an application model that separates applications into individual views and executes the individual views with independent processes; and loading code corresponding only with a running view in a memory and executing a corresponding application in the composed application model when switching to the running view for execution of the corresponding application.

2. The operation method of claim 1, wherein executing the corresponding application comprises sending data that needs to be shared among a plurality of views in accordance with an execution argument when switching to the running view.

3. The operation method of claim 1, wherein executing the corresponding application comprises removing a code for a non-running view from the memory when switching to the running view.

4. The operation method of claim 1, wherein the individual views represent interface screens on which each of the separate applications provide a particular function to a user through interfacing.

5. An operation device of a mobile application model, comprising:

a plurality of applications;
a display for displaying a running view;
a memory; and
a processor for composing an application model that separates the applications into individual views and executes the individual views with independent processes, loading code corresponding only with the running view in the memory and executing a corresponding application in the composed application model when switching to the running view for execution of the corresponding application.

6. The operation device of claim 5, wherein executing the corresponding application comprises sending data that needs to be shared among a plurality of views in accordance with an execution argument when switching to the running view.

7. The operation device of claim 5, wherein the processor removes a code for a non-running view from the memory when switching to the running view in the composed application model.

8. The operation device of claim 5, wherein the individual views represent interface screens on which each of the separate applications provide a particular function to a user through interfacing.

* * * * *